(12) United States Patent
Kang et al.

(10) Patent No.: US 8,878,081 B2
(45) Date of Patent: Nov. 4, 2014

(54) TOUCH PANEL AND DISPLAY DEVICE HAVING THE SAME WITH SECOND CONNECTOR ATTACHED TO A SECOND SIDE OF THE SUBSTRATE

(71) Applicant: LG Electronics Inc., Seoul (KR)

(72) Inventors: Pilgoo Kang, Seoul (KR); Hangyu Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 13/645,243

(22) Filed: Oct. 4, 2012

(65) Prior Publication Data
US 2013/0314335 A1    Nov. 28, 2013

(30) Foreign Application Priority Data
May 23, 2012 (KR) .......................... 10-2012-0054664

(51) Int. Cl.
*G06F 3/041* (2006.01)
(52) U.S. Cl.
USPC ..................................................... 178/18.01
(58) Field of Classification Search
CPC .......... G06F 3/047; G06F 2203/04103; G06F 2203/04107; G06F 2203/04111; G06F 2203/04113
USPC ..................... 345/173–178; 178/18.01–19.03
See application file for complete search history.

(56) References Cited

U.S. PATENT DOCUMENTS

| 2010/0110041 A1* | 5/2010 | Jang ............................. 345/174 |
| 2011/0141042 A1* | 6/2011 | Kim et al. ..................... 345/173 |
| 2011/0304566 A1* | 12/2011 | Han ............................. 345/173 |
| 2013/0176238 A1* | 7/2013 | Lo et al. ....................... 345/173 |

* cited by examiner

*Primary Examiner* — Liliana Cerullo
(74) *Attorney, Agent, or Firm* — Birch, Stewart, Kolasch & Birch, LLP

(57) ABSTRACT

A touch panel including a transparent substrate having an active area and an inactive area on a circumference of the active area; a plurality of X-axis and Y-axis electrodes; a first controller attached to a first side of the transparent substrate including the inactive area, and including a driving IC configured to control the X-axis and Y-axis electrode sensors; a second controller attached to a second side of the transparent substrate including the inactive area, in which the second side is opposite to the first side; a plurality of lead lines provided to the inactive area and connecting each of the X-axis and Y-axis electrode sensors with one of the first and second controllers; and a signal channel connecting the second controller to the driving IC of the first controller and being spaced away from the transparent substrate including the X-axis and Y-axis electrode sensors and the lead lines.

20 Claims, 8 Drawing Sheets

TOUCH PANEL AND DISPLAY DEVICE HAVING THE SAME WITH SECOND CONNECTOR ATTACHED TO A SECOND SIDE OF THE SUBSTRATE

Pursuant to 35 U.S.C. §119(a), this application claims the benefit of earlier filing date and right of priority to Korean Application No. 10-2012-0054664, filed on May 23, 2012, the contents of which are hereby incorporated by reference herein in their entirety.

BACKGROUND OF THE INVENTION

1. Field of the Invention

The present invention relates to a touch panel, and more particularly, to a touch panel and display device having the same.

2. Discussion of the Related Art

A display device can perform various functions such as capturing images and video via a camera, recording video and audio, playing music files via a speaker system, and displaying images and video on a display. Generally, display devices can be classified into mobile devices and stationary devices. The display devices can also be classified into handheld devices and vehicle mounted devices.

However, the mobile terminal is small in size, which puts restrictions on the display device. Thus, the user sometimes has problems operating or viewing the device display because of the small size.

SUMMARY OF THE INVENTION

Accordingly, one object of the present invention is to provide a display device that substantially obviates one or more problems due to limitations and disadvantages of the related art.

Another object of the present invention is to provide a touch panel and corresponding display device with a reduced width of an inactive area of the touch panel.

Still another object of the present invention is to provide a touch panel and corresponding display device having an increased number of electrode sensors while maintaining a width of an inactive area.

To achieve these objects and other advantages and in accordance with the purpose of the invention, as embodied and broadly described herein, the present invention provides in one aspect a touch panel including a transparent substrate having an active area and an inactive area on a circumference of the active area; a plurality of X-axis electrode sensors extending in a horizontal direction and covering the active area A; a plurality of Y-axis electrode sensors extending in a vertical direction, crossing the X-axis electrode sensors and covering the active area A; a first controller attached to a first side of the transparent substrate including the inactive area, and including a driving IC configured to control the X-axis and Y-axis electrode sensors; a second controller attached to a second side of the transparent substrate including the inactive area, in which the second side is opposite to the first side; a plurality of lead lines provided to the inactive area and connecting each of the X-axis and Y-axis electrode sensors with one of the first and second controllers; and a signal channel connecting the second controller to the driving IC of the first controller and being spaced away from the transparent substrate including the X-axis and Y-axis electrode sensors and the lead lines. The present invention also provides a corresponding display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. The present invention can be applicable to a various types of display devices such as mobile phones, user equipments, smart phones, digital broadcast receivers, personal digital assistants, laptop computers, portable multimedia players (PMP), navigators and the like. The present application is also applicable to such a fixed display device as a digital TV, a desktop computer and the like.

Figure 1:
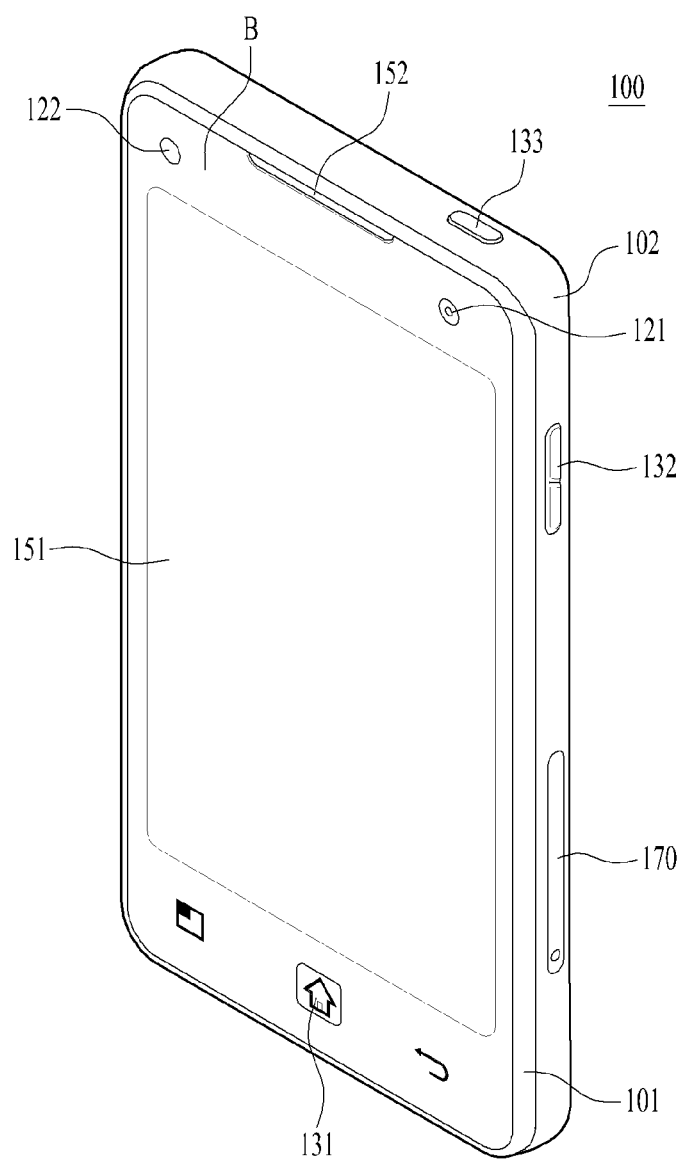
FIG. 1 is a front perspective diagram of a display device according to one embodiment of the present invention.

First, FIG. 1 is a front perspective diagram of a display device 100 according to one embodiment of the present invention. As shown, the display device 100 shown in the drawing has a bar type display device body. However, the display device 100 may be implemented in a variety of different configurations such as a folder-type, slide-type, rotational-type, swing-type and combinations thereof. For clarity, the following description will primarily relate to a bar-type display device 100. However such teachings apply equally to other types of display devices.

Referring to FIG. 1, the display device 100 includes a case configuring an exterior thereof. In the present embodiment, the case is divided into a front case 101 and a rear case 102. Various electric/electronic parts are loaded in a space provided between the front and rear cases 101 and 102. In addition, the cases 101 and 102 may be formed by injection molding of synthetic resin or be formed of a metal substance such as stainless steel (STS), titanium (Ti) or the like, for example.

As shown in FIG. 1, the display device 100 also includes a display 151, an audio output unit 152, a camera 121, user input units 130/131 and 132, a microphone 122, and an interface 170 provided to the case 101 or 102. Further, the display 151 occupies most of a main face of the front case 101.

The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

Further, the audio output module 152 functions in various modes including a call-receiving mode, a call-placing mode, a recording mode, a voice recognition mode, a broadcast reception mode and the like to output audio data which is received from a wireless communication unit or stored in a memory. During operation, the audio output module 152 outputs audio relating to a particular function (e.g., call received, message received, etc.). The audio output module 152 may be implemented using one or more speakers, buzzers, other audio producing devices, and combinations thereof.

In addition, the camera 121 receives and processes image frames of still pictures or video, which are obtained by an image sensor in a video call mode or a photographing mode. The processed image frames can then be displayed on the display 151. The image frames processed by the camera 121 can be stored in a memory or can be externally transmitted via a wireless communication unit. Optionally, at least two cameras 121 can be provided to the display device 100.

The microphone 122 receives an external audio signal while the device is in a particular mode, such as phone call mode, recording mode and voice recognition. This audio signal is then processed and converted into electric audio data. The processed audio data is transformed into a format transmittable to a mobile communication base station via a mobile communication module for a call mode. The microphone 122 may also include assorted noise removing algorithms to remove noise generated in the course of receiving the external audio signal.

Further, the user input unit 130 may be manipulated to receive an input of a command for controlling an operation of the display device 100 and in this embodiment includes a plurality of manipulation units 131, 132 and 133. Each of the manipulation units 131, 132 and 133 may include a button configured to recognize a pressure applied thereto by a user. Moreover, if a touch sensor is provided to each of the manipulation units 131, 132 and 133, the manipulation units 131, 132 and 122 can receive an input of a user command through a user's touch.

The display 151 is implemented to visually display (output) information associated with the display device 100. For instance, if the display device is operating in a phone call mode, the display 151 can provide a user interface (UI) or graphical user interface (GUI) which includes information associated with placing, conducting, and terminating a phone call. As another example, if the display device 100 is in a video call mode or a photographing mode, the display 151 can additionally or alternatively display images which are associated with these modes, the UI or the GUI.

The display 151 also be a liquid crystal display (LCD), a thin film transistor-liquid crystal display (TFT-LCD), an organic light-emitting diode display (OLED), a flexible display and a three-dimensional display. The display device 100 may include one or more of such displays. Some of the above displays can be implemented in a transparent or optical transmittive type, which is called a transparent display. As a representative example for the transparent display, there is TOLED (transparent OLED) or the like.

Further, a rear configuration of the display 151 can be implemented in the optical transmittive type as well. In this configuration, a user can see an object in rear of a display device body via the area occupied by the display 151. At least two displays 151 can also be provided to the display device 100. For instance, a plurality of displays can be arranged on a single face of the display device 100 by being spaced apart from each other or being built in one body. Alternatively, a plurality of displays can be arranged on different faces of the display device 100.

Figure 2:
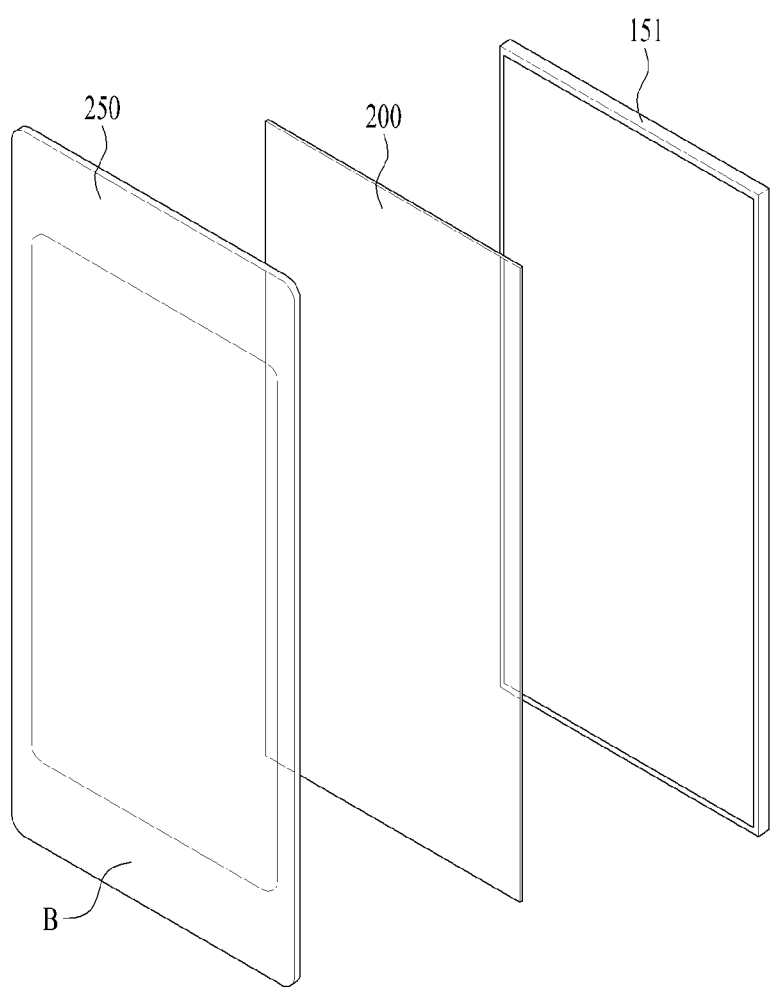
FIG. 2 is an exploded perspective diagram of a display unit, a touch panel and a window glass in a display device according to one embodiment of the present invention.

Referring to FIG. 2, a protective transparent window glass/transparent substrate 250 may be attached to a front side of the display unit 151. Moreover, a touch panel 200 may be provided to the front side of the display unit 151 to detect a touch action with the display unit 151. The touch panel 200 may be a PROCAP (projected capacitive) type of converting a variation of capacitance generated from a specific portion of the display unit 151 to an electrical input signal.

The touch panel 200 may also include a film based (GFF) based configuration or a glass based (BB) configuration. Electrode sensors 210 (see FIG. 3) are formed on a plurality of films or glasses and are then stacked on each other. Hence, if the touch panel 200 is touched by a user, a variation of capacitance is detected to receive an input signal. Alternatively, instead of using separate films or glasses, an all-in-one type touch panel 200 having electrodes formed on the transparent substrate 250 directly may be used. Since the film or glass layers are not stacked, a good performance in optical aspect or touch aspect can be achieved.

Figure 3:
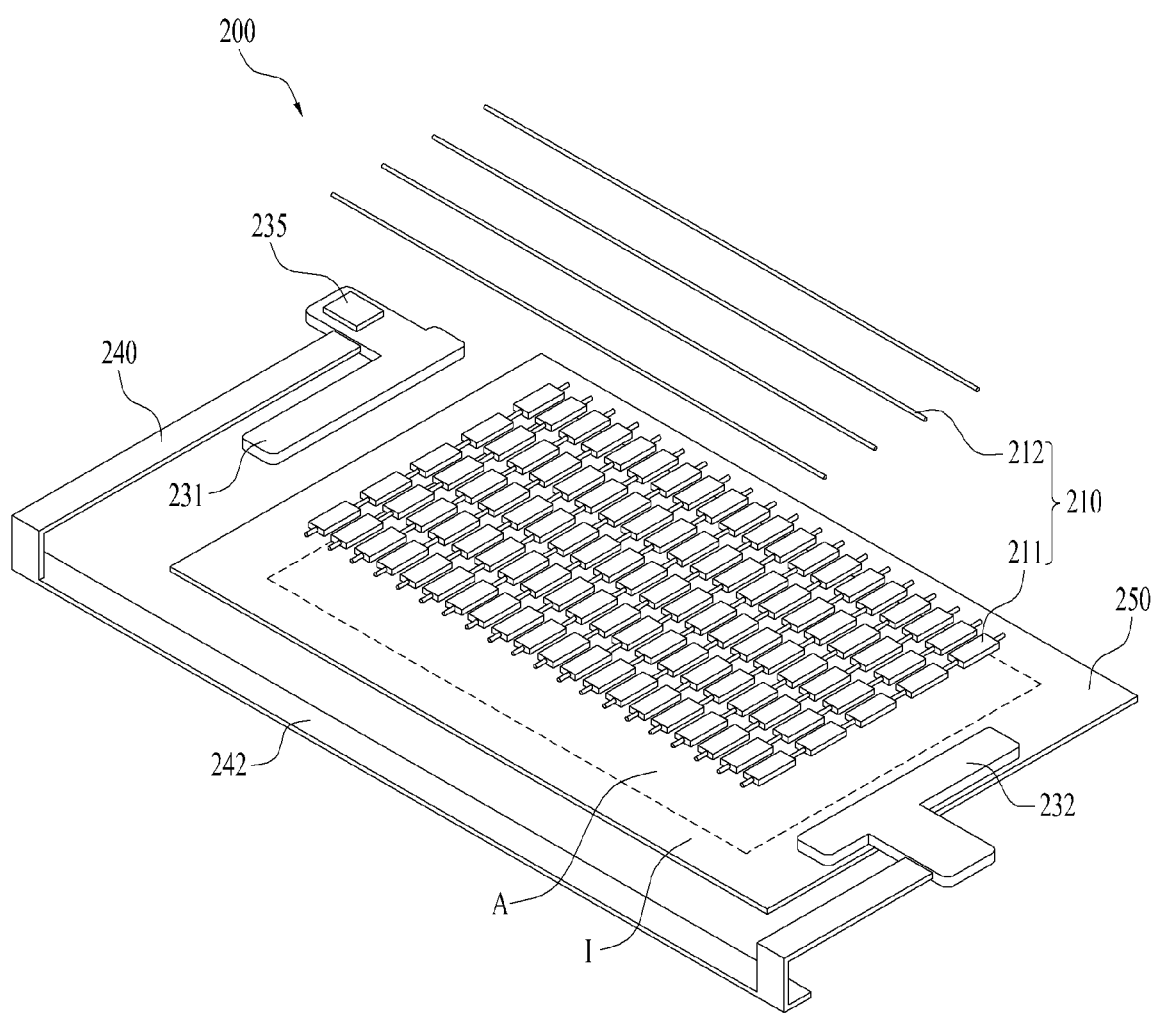
FIG. 3 is an exploded perspective diagram of a touch panel in a display device according to one embodiment of the present invention.
Figure 4:
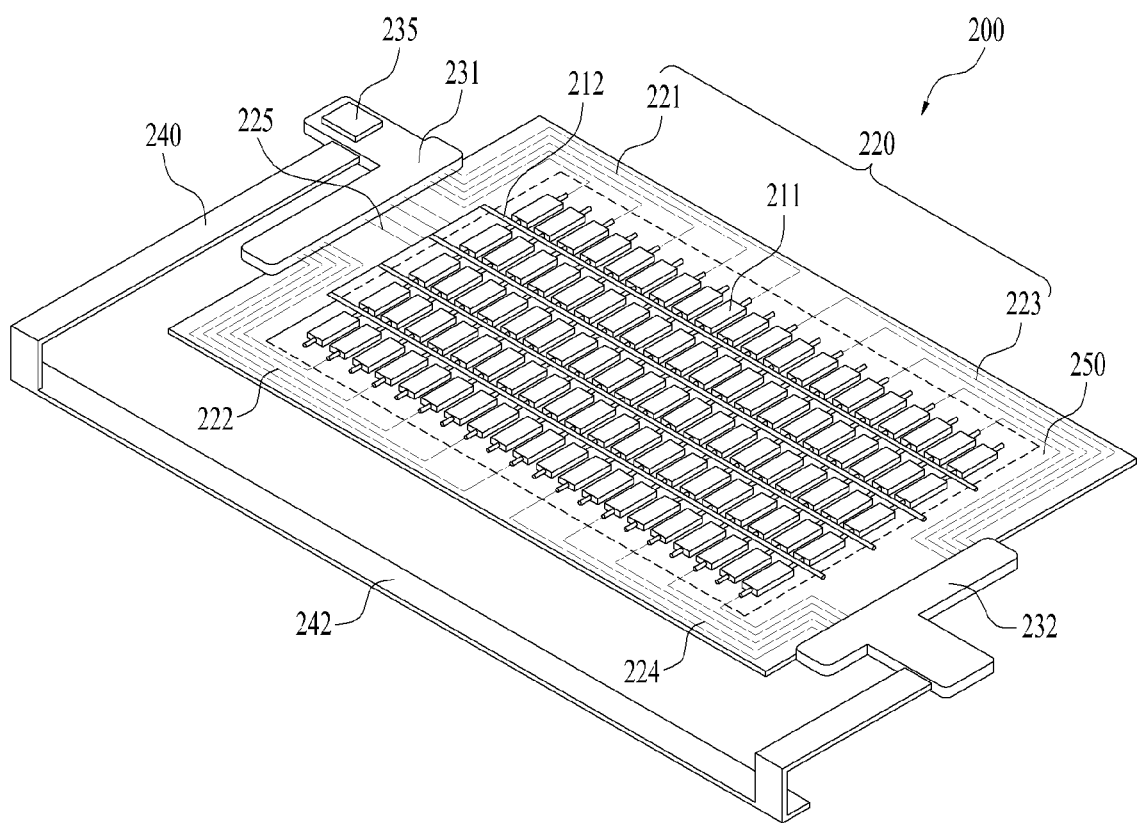
FIG. 4 is a perspective diagram of a touch panel in a display device according to one embodiment of the present invention.

Further, the electrode sensor 210 is directly formed on the glass without a separate film layer in FIG. 3 or 4, by which the present invention is non-limited. Alternatively, a film based (GFF) touch panel or a glass based (GG) touch panel may be used. An all-in-one type touch panel having the electrode sensor formed on the window glass 250 directly can also be used.

Next, FIGS. 3 and 4 are perspective diagrams of the touch panel 200 in a display device according to one embodiment of the present invention. In particular, FIGS. 3 and 4 are exploded and assembled diagrams of the touch panel 200 including an electrode sensor 210 with X-axis electrode sensors 211 and Y-axis electrode sensors 212. Also included are a first controller 231, second controller 232, driving IC 235, lead line 220, signal channel 240 and transparent substrate 250.

Further, the touch panel 200 is divided into an activate area A and an inactive area I formed on a circumference of the active area A (see FIG. 3). The electrode sensor 210 that can recognize a touch is situated in the active area A. Since a screen of the display 151 attached to a backside needs to be viewed by a user, the electrode sensor 210 is formed of a transparent material while each of the lead line 220, first controller 231 and second controller 232 provided to the inactive area I can be made of a non-transparent material.

In more detail, the electrode sensor 210 may be formed of ITO (indium tin oxide) that is electrically conductive and a transparent material. As mentioned in the foregoing description, the touch panel 200 may be formed by forming an ITO electrode on a separate film or glass and then stacking the ITO film or the ITO glass. Alternatively, a pattern may be formed by directly forming an ITL electrode pattern on a window glass using ITO ink.

In addition, the transparent substrate 250 is a base layer for forming the electrode sensor 210 thereon and may include a glass for a glass type (GG) or a film for a fill type (GFF). Alternatively, the transparent substrate 250 may be directly formed on a window glass for an all-in-one type. FIG. 2 shows one example of forming the transparent substrate 250 directly on the window glass, whereby the transparent substrate 250 is the window glass.

Further, the X-axis electrode sensors 211 can be configured to extend in a horizontal direction and the Y-axis electrode sensors 212 configured to extend in a vertical direction. Then, if a user touches the intersection between the two kinds of the electrode sensors 211 and 212, the user's command is input and the capacitance of each of the electrodes varies. The capacitance variation is then delivered to a controller or processor.

In addition, when film or glass type electrode sensors are stacked on each other, an insulating layer can be inserted between the X-axis electrode sensors 211 and the Y-axis electrode sensors 212 to prevent the two kinds of the electrode sensors 211 and 212 from coming in contact with each other. For the transparent substrate/window glass 250 and the touch panel 200 of the all-in-one type, an insulating substance may be inserted at the intersection between the X-axis electrode sensors 211 and the Y-axis electrode sensors 212 only.

The shapes of the X-axis and Y-axis electrode sensors 211 and 212 are also not limited by the shapes shown in FIGS. 3 and 4. The discrimination between the X-axis electrode sensors 211 and the Y-axis electrode sensors 212 is determined to randomly discriminate the two kinds of the electrode sensors 210 crossing with each other. Alternatively, the electrode sensors 211 and 212 may be interchanged in accordance with a direction of the touch panel 200.

For clarity of the following description, when a long direction and a short direction are set to a vertical direction and a horizontal direction, respectively, the electrode sensor 210 extending in the horizontal direction is defined as the X-axis electrode sensors 211 and the electrode sensor 210 extending in the vertical direction is defined as the Y-axis electrode sensors 212.

Further, the first and second controllers 231 and 232 are formed on connecting parts provided to one side of the inactive area I. A driving IC 235 is included in the first controller/connecting part 231 in FIGS. 3 and 4. The first and second controllers 231 and 232 (hereinafter referred to also as connecting part 231/232) and the electrode sensor 210 are connected with each other via the lead line 220. In particular, the lead line 220 is made of a metal such as Cu and the like. Since the lead line 220 is non-transparent unlike ITO, the lead line 220 may correspond to the inactive area I.

Further, although the lead line 220 is non-transparent, it has a low sheet resistance of about 0.4 Ω/sq, and thus is advantageous in that charge movement is fast. Also, the ITO has electric conductivity, but has a sheet resistance of about 100 Ω/sq and resistance greater than that of a metal electrode (i.e., resistance 200~300 times greater than that of a general electrode), which causes a problem that current does not flow smoothly.

Therefore, the lead line 220 made of metal can be used in the inactivate area I for quick delivery of signals. Because the lead line 220 is non-transparent, the inactive area I may be covered with a non-transparent bezel B to prevent the lead line 220 from being seen. In particular, the bezel B is formed on a circumference of the active area A to cover the lead line 220 provided to the inactive area I by leaving the active area A uncovered. Thus, a size of the bezel B is closely related to a size of the active area A. Therefore, if a size of bezel B increases, a size of the display unit 151 exposed in front view is decreased.

Figure 7:
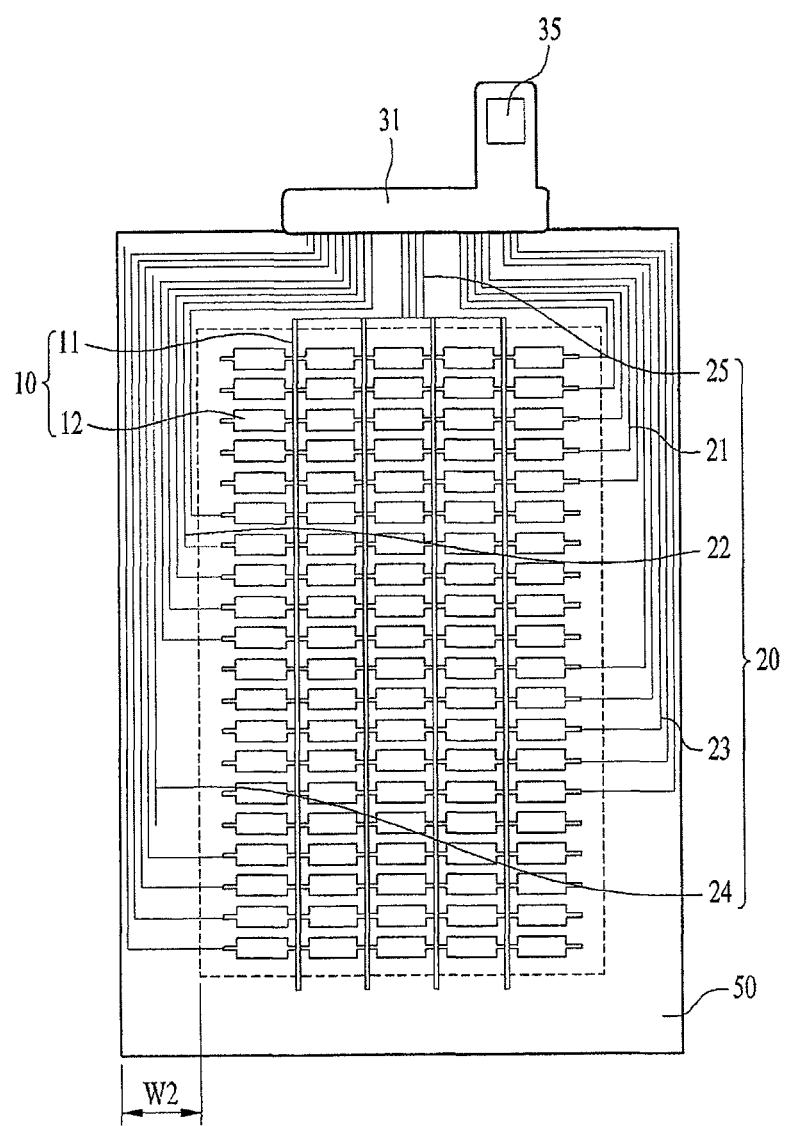
FIGS. 7 and 8 are layouts of a related art touch panel in a display device.

Thus, it is preferable that the size of the inactive area I is set small to create a larger active area A. In more detail, FIG. 7 illustrates a related art touch panel. Referring to FIG. 7, because a Y-axis electrode sensor 12 extends in a vertical direction, a lead line 20 directly extends to a connecting part 31. However, lead lines 21 to 24 connected with an X-axis electrode sensor 11 pass through an inactive area I situated on a left/right side of an active area A and then extend to the connecting part 31 situated on a top end.

According to this structure, the larger a size of a touch panel becomes, the greater the number of X-axis electrode sensors 11. Further, as the number of lead lines increases, a width W2 of a lateral inactive area having the lead lines pass through thereon increases.

In order to solve the above problem, the present invention reduces a width W1 of a lateral inactive area I to become ½ or smaller than the width W2 of the lateral inactive area of the related art display device by rearranging a position of the lead line 220 shown in one of FIGS. 3 to 6.

Figure 5:
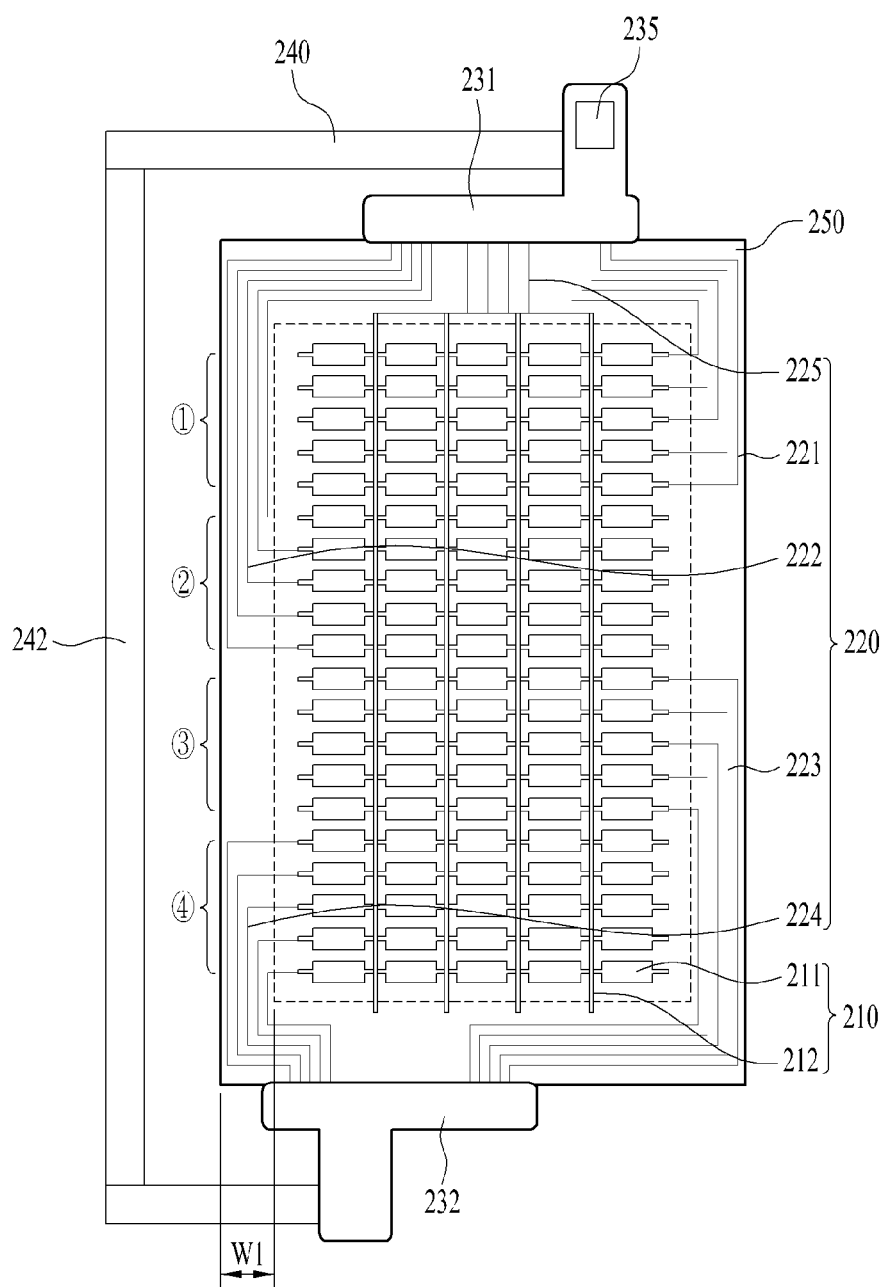
FIG. 5 is a layout of a touch panel in a display device according to another embodiment of the present invention.

Referring to FIG. 4, the present invention has a pair of the connecting parts 231 and 232. In this embodiment, the first controller/first connecting part 231 including the driving IC 235 and the second controller/second connecting part 232 are formed on the inactive area I. In more detail, FIGS. 4 and 5 show that the first controller/first connecting part 231 is situated at an end portion of one side in vertical direction and that the second controller/second connecting part 232 is situated at an end portion of the other side in the vertical direction. However, the positions of the first and second controllers/connecting parts 231 and 232 are non-limited. In particular, the second controller 232 having the driving IC 235 not included therein may be formed on a left/right inactive area I.

In addition, in order to decrease a size of the lateral inactive area I, as shown in FIG. 4, the controllers/connecting parts 231 and 232 are preferably provided to top and bottom sides in the horizontal direction. For clarity, the following description is made with reference to the first controller/connecting part 231 provided to an end portion of one side in the vertical direction and the second controller/connecting part 232 provided to an end portion of the other side in the vertical direction, as shown in FIGS. 4 and 5.

As the pair of the connecting parts 231 and 232 are provided, the lead line 220 is distributed. In particular, as shown in FIG. 4, the X-axis electrode sensors 211 provided closer to the first controller/connecting part 231 on a top part are connected with the first controller/connecting part 231 by the lead lines (hereinafter named first lead line) 221 and 222 extending in the top direction, while the X-axis electrode sensors 211 provided closer to the second controller/connecting part 232 on a bottom part are connected with the second controller 232 by the lead lines (hereinafter named second lead line) 223 and 224 extending in bottom direction.

Further, the lead lines do not have to be divided equally to the top and bottom parts. However, in order for the lead lines 220 to avoid being unnecessarily elongated and to prevent the lead lines 200 from crossing with each other, it is preferable that the lead lines 220 connect the X-axis electrode sensors 211 closer to the connecting part 231/232 with the corresponding connecting part 231/232.

If the lead lines 220 are distributed to both right and left sides rather than arranged to incline to one of the right and left sides, the widths of the inactive areas I on both of the right and left sides may be equalized and the inactive area I on the right or left side can be prevented from increasing. In particular, the lead lines connected with the X-axis electrode sensors 211 include the first right lead lines 221 provided to the right inactive area I to extend in the top direction, the first left lead lines 222 provided to the left inactive area I to extend in the top direction, the second right lead lines 223 provided to the right inactive area I to extend in the bottom direction, and the second left lead lines 224 provided to the left inactive area I to extend in the bottom direction.

Thus, the width of the inactive area I can be minimized because the number of the first right lead lines 221, first left lead lines 222, second right lead lines 223 and second left lead lines 224 are set almost equal to each other, and the X-axis electrode sensors 211 can be divided into four equal parts in accordance with the connected lead lines 221, 222, 223 and 224.

For instance, referring to FIG. 5, the X-axis electrode sensors 211 may be divided into 4 parts including a most upper part ①, a second part ②, a third part ③ and a fourth part ④. In particular, the X-axis electrode sensors 211 of the most upper part ① are connected to the first controller 231 via the first right lead lines 221, the X-axis electrode sensors 211 of the second part ② are connected to the first controller 231 via the first left lead lines 222, the X-axis electrode sensors 211 of the third part ③ are connected to the second controller 232 via the second right lead lines 223, and the X-axis electrode sensors 211 of the fourth part ④ are connected to the second controller 232 via the second left lead lines 224.

Alternatively, referring to FIG. 4, the X-axis electrode sensors 211 may be alternately connected with the right and left lead lines 221, 222, 223 and 224. In addition, the X-axis electrode sensors 211 connected to the first lead lines 221 and 222 extending to the first controller 231 are connected to the driving IC 235. However, because the X-axis electrode sensors 211 connected to the second lead lines 223 and 224 extending to the second controller 232 have a problem of not being connected to the driving IC 235, the signal channel 240 is provided to solve the problem.

That is, the signal channel 240 includes a line connecting the first controller/connecting part 231 and the second controller/connecting part 232 to each other and is situated in a plane different from each of the electrode sensor 210 and the lead line 200. In particular, the part used to be connected via the lateral inactive area in the related art is connected to the driving IC 235 via another plane.

Referring to FIG. 4, one portion 242 of the signal channel 240 is bent below the transparent substrate 250 having the lead line 220 and the transparent electrodes 210. Alternatively, the corresponding portion 242 may be bent upward in accordance with an assembly direction of the touch panel.

Further, the signal channel 240 is arranged to be situated, as shown in FIG. 4, on a layer different from that of the electrode sensor 210 and the lead line 220. The signal channel 240 can also be formed by depositing metal on such a hard member as glass an injection-molded object and the like. Alternatively, the signal channel 240 can include a flexible printed circuit board (FPCB) having a metal lead line formed on a base made of such a flexible material as polyimide, polyester, epoxy and the like.

When such a flexible base is used like the flexible printed circuit board (FPCB), the signal channel 240 may be freely arranged between the internal components of the display device 100. Therefore, the signal channel 240 can be added without rearranging the internal components considerably.

When the lead lines 220 are distributed in the above manner, the lines 220 are distributed on the inactive area I more evenly than the related art lead lines 20 arranged on the right and left sides shown in FIG. 7. Therefore, the width W of the inactive area I on each of the right and left sides can be reduced into a half of the width W2 of the lateral inactive area of the related art.

Figure 6:
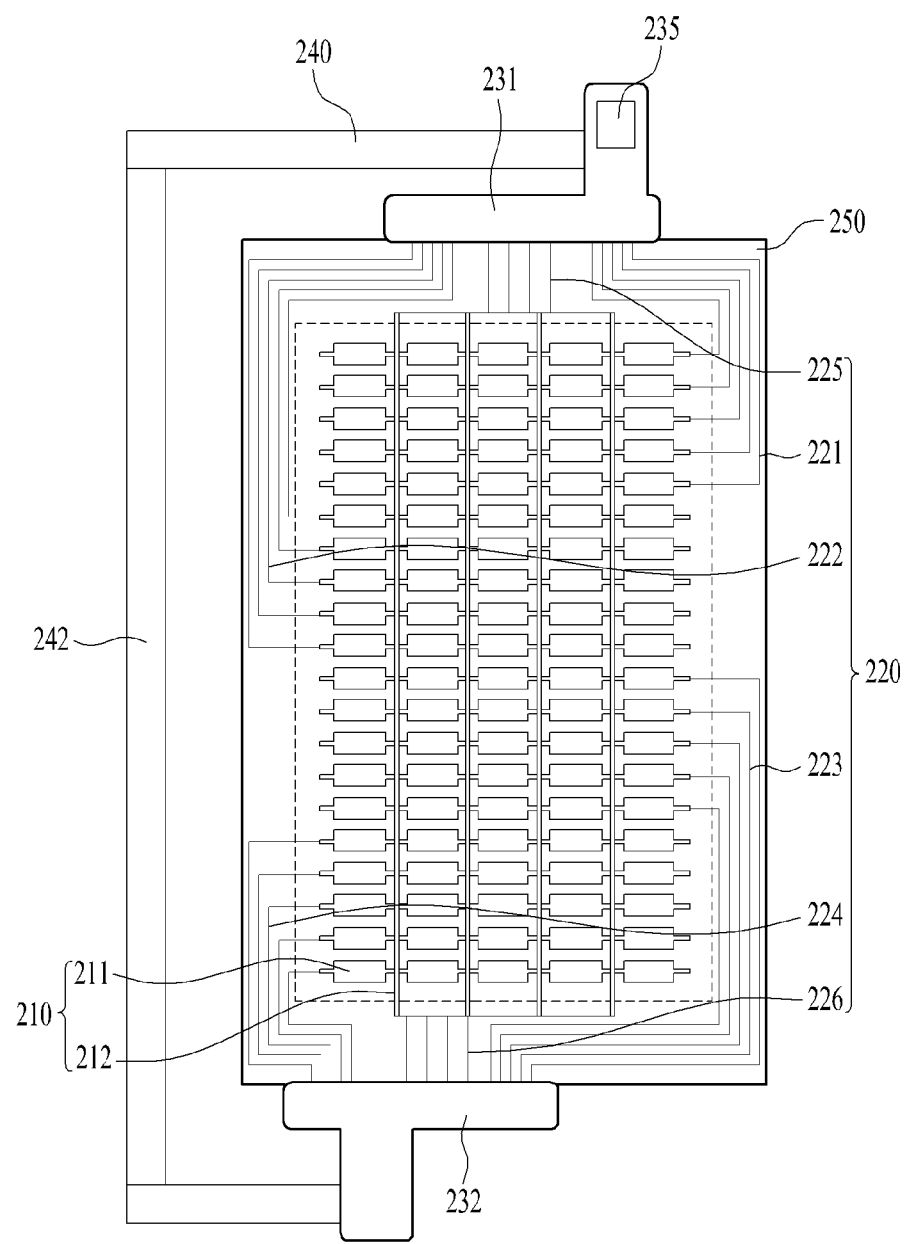
FIG. 6 is a layout of a touch panel in a display device according to a further embodiment of the present invention.

Next, FIG. 6 is a layout of a touch panel in a display device according to a further embodiment of the present invention. Referring to FIG. 6, lead lines 225 and 226 are connected to both ends of Y-axis electrode sensors 212 to be connected to a first controller 235 and a second controller 232, respectively.

As a size of the display device 100 tends to increase gradually, a size of the touch panel 200 increases to elongate each electrode sensor 210 as well. In particular, because one side of the Y-axis electrode sensors 212, which is a long-axis electrode sensor 210, is only connected, a speed of movement of charges can be reduced. Hence, a reaction rate is lowered, which can be a problem.

In order to solve this problem, the lead lines 225 and 226 are connected to both ends of the Y-axis electrode sensors 212, whereby both end portions can be connected to the driving IC 235. If so, the touch sensitivity is better than having one side connected only, which is called double routing. Further, the double routing may be applicable to the X-axis electrode sensors 211 as well.

Figure 8:
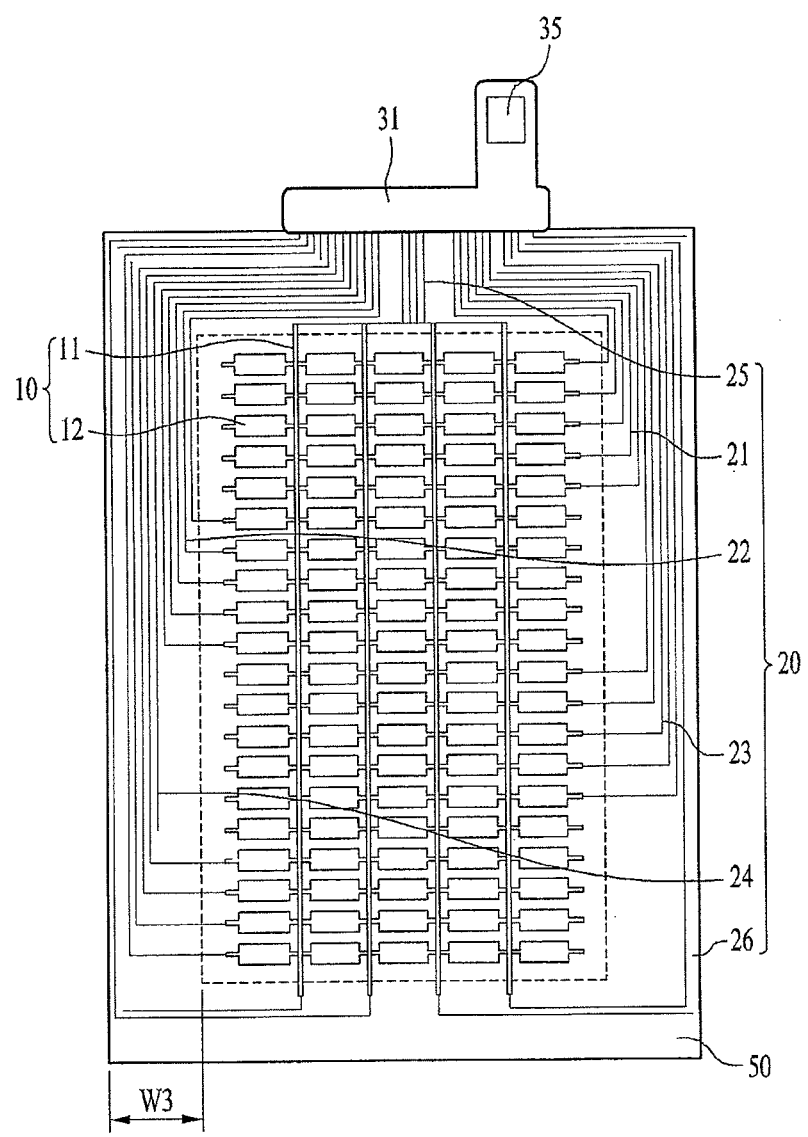

However, referring to FIG. 8, because the lead line 26 connected to an end portion of the Y-axis electrode sensors 12 on the side not having the connecting part passes through the inactive area I in a lateral direction, a width W3 of the lateral inactive area I is increased by a width of the lead lines 26 connected to an end portion of the other side of the Y-axis electrode sensors 212.

According to the present invention, referring to FIG. 6, because a pair of the controllers/connecting parts 231 and 232 are provided, one end of the Y-axis electrode sensors 212 is connected to the first controller/connecting part 231, the other end of the Y-axis electrode sensors 212 is connected to the second controller/connecting part 232, and the second controller/connecting part 232 is connected with the driving IC 235 via the signal channel 240.

This structure enables the lead line 200 increased due to the double routing to be connected via the signal channel 240 situated in a different plane, whereby the width of the right/left inactive area I can be decreased compared to the lead line arrangement shown in FIG. 8 by the number of the lead lines 226 increased due to the double routing.

Accordingly, the present invention provides the following advantages. First, the present invention provides a touch panel and corresponding display device with a decreased width of an inactive area I. Secondly, the present invention increases the number of electrode sensors while maintaining a width of an inactive area I.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel comprising:
a transparent substrate having an active area and an inactive area on a circumference of the active area;
a plurality of X-axis electrode sensors extending in a horizontal direction and covering the active area;
a plurality of Y-axis electrode sensors extending in a vertical direction, crossing the X-axis electrode sensors and covering the active area;
a first connector formed on a first side of the transparent substrate including the inactive area, and including a driving IC configured to control the X-axis and Y-axis electrode sensors;
a second connector formed on a second side of the transparent substrate including the inactive area, said second side being opposite to the first side;
a plurality of lead lines provided to the inactive area and connecting each of the X-axis and Y-axis electrode sensors with one of the first and second connectors; and
a signal channel comprising a flexible printed circuit board (FPCB) to connect the second connector to the driving IC of the first connector,
wherein a portion of the FPCB is placed on a different layer from a layer of the transparent substrate including the X-axis and Y-axis electrode sensors and the lead lines.

2. The touch panel of claim 1, wherein a length of a corresponding Y-axis electrode sensor is longer than a corresponding X-axis electrode sensor, and
wherein the first and second sides of the transparent substrate are width sides of the transparent substrate.

3. The touch panel of claim 2, wherein the plurality of the lead lines include first lead lines extending from ends of a first set of X-axis electrodes to the first connector and second lead lines extending from ends of a second set of X-axis electrodes to the second connector, and
wherein the first set of X-axis electrodes is closer to the first connector, and the second set of X-axis electrodes is closer to the second connector.

4. The touch panel of claim 3, wherein the plurality of lead lines further include third lead lines extending straight from the first connector to first ends of the Y-axis electrodes.

5. The touch panel of claim 4, wherein the plurality of lead lines further include fourth lead lines extending straight from the second connector to second ends of the Y-axis electrodes.

6. The touch panel of claim 3, wherein the first and second lead lines are evenly distributed to a left inactive area and a right inactive area of the transparent substrate.

7. The touch panel of claim 3, wherein a first side of the first lead lines are connected to odd-numbered X-axis electrodes and a second side of the first lead lines are connected to even-numbered X-axis electrodes, and a first side of the second lead lines are connected to even-numbered X-axis electrodes and a second side of the second lead lines are connected to odd-numbered X-axis electrodes.

8. The touch panel of claim 1, wherein the signal channel extends away from the first and second connectors until a position spaced from the transparent substrate, bending vertically at the position spaced from the transparent substrate, and protruding inwards toward the transparent substrate.

9. The touch panel of claim 1, wherein the X-axis and Y-axis electrode sensors are arranged in a same plane on the transparent substrate, and include an insulating member disposed at an intersection between the X-axis and Y-axis electrode sensors.

10. The touch panel of claim 9, wherein the X-axis and Y-axis electrode sensors are formed by depositing ITO on the transparent substrate.

11. A display device comprising:
a case;
a display unit attached to the case and configured to output image information; and
a touch panel attached to the display unit and configured to generate an electric signal upon receiving a contact,
wherein the touch panel includes:
a transparent substrate having an active area and an inactive area on a circumference of the active area;
a plurality of X-axis electrode sensors extending in a horizontal direction and covering the active area;
a plurality of Y-axis electrode sensors extending in a vertical direction, crossing the X-axis electrode sensors and covering the active area;
a first connector formed on a first side of the transparent substrate including the inactive area, and including a driving IC configured to control the X-axis and Y-axis electrode sensors;
a second connector formed on a second side of the transparent substrate including the inactive area, said second side being opposite to the first side;
a plurality of lead lines provided to the inactive area and connecting each of the X-axis and Y-axis electrode sensors with one of the first and second connector; and
a signal channel comprising a flexible printed circuit board FPCB to connect the second connector to the driving IC of the first connector,
wherein a portion of the FPCB is placed on a different layer from a layer of the transparent substrate including the X-axis and Y-axis electrode sensors and the lead lines.

12. The display device of claim 11, wherein a length of a corresponding Y-axis electrode sensor is longer than a corresponding X-axis electrode sensor, and
wherein the first and second sides of the transparent substrate are width sides of the transparent substrate.

13. The display device of claim 12, wherein the plurality of the lead lines include first lead lines extending from ends of a first set of X-axis electrodes to the first connector and second lead lines extending from ends of a second set of X-axis electrodes to the second connector, and
wherein the first set of X-axis electrodes is closer to the first connector, and the second set of X-axis electrodes is closer to the second connector.

14. The display device of claim 13, wherein the plurality of lead lines further include third lead lines extending straight from the first connector to first ends of the Y-axis electrodes.

15. The display device of claim 14, wherein the plurality of lead lines further include fourth lead lines extending straight from the second connector to second ends of the Y-axis electrodes.

16. The display device of claim 13, wherein the first and second lead lines are evenly distributed to a left inactive area and a right inactive area of the transparent substrate.

17. The display device of claim 13, wherein a first side of the first lead lines are connected to odd-numbered X-axis electrodes and a second side of the first lead lines are connected to even-numbered X-axis electrodes, and a first side of the second lead lines are connected to even-numbered X-axis electrodes and a second side of the second lead lines are connected to odd-numbered X-axis electrodes.

18. The display device of claim 11, wherein the signal channel extends away from the first and second connectors until a position spaced from the transparent substrate, bending vertically at the position spaced from the transparent substrate, and protruding inwards toward the transparent substrate.

19. The display device of claim 11, wherein the X-axis and Y-axis electrode sensors are arranged in a same plane on the transparent substrate, and include an insulating member disposed at an intersection between the X-axis and Y-axis electrode sensors.

20. The display device of claim 19, wherein the X-axis and Y-axis electrode sensors are formed by depositing ITO on the transparent substrate.

\* \* \* \* \*